April 24, 1945. J. H. DORAN 2,374,588
HYDRAULIC TORQUE TRANSMISSION ARRANGEMENT
Filed Aug. 22, 1942

Inventor:
John H. Doran,
by Harry E. Dunham
His Attorney.

Patented Apr. 24, 1945

2,374,588

UNITED STATES PATENT OFFICE 2,374,588

HYDRAULIC TORQUE TRANSMISSION ARRANGEMENT

John H. Doran, Scotia, N. Y., assignor to General Electric Company, a corporation of New York Application August 22, 1942, Serial No. 455,807

11 Claims. (Cl. 60—53)

The present invention relates to hydraulic torque transmission arrangements for transmitting torque from a driving shaft to a driven shaft by means of hydraulic gears preferably of the positive displacement pump type such as are disclosed in my copending application, Serial No. 431,742, filed February 20, 1942, issued February 27, 1945, as Patent No. 2,370,526.

The general object of my invention is to provide an improved construction of hydraulic torque transmission arrangement which is economical and efficient during operation. A specific object of my invention is to provide a hydraulic torque transmission arrangement with overspeed drive whereby the secondary or driven shaft may be operated at a speed greater than the primary or driving shaft. Such arrangements are particularly useful for operating propellers, automobiles, trucks, locomotives and like vehicles.

For a consideration of what I believe to be novel and my invention, attention is directed to the following description and the claims appended thereto in connection with the accompanying drawing.

Figure 1:
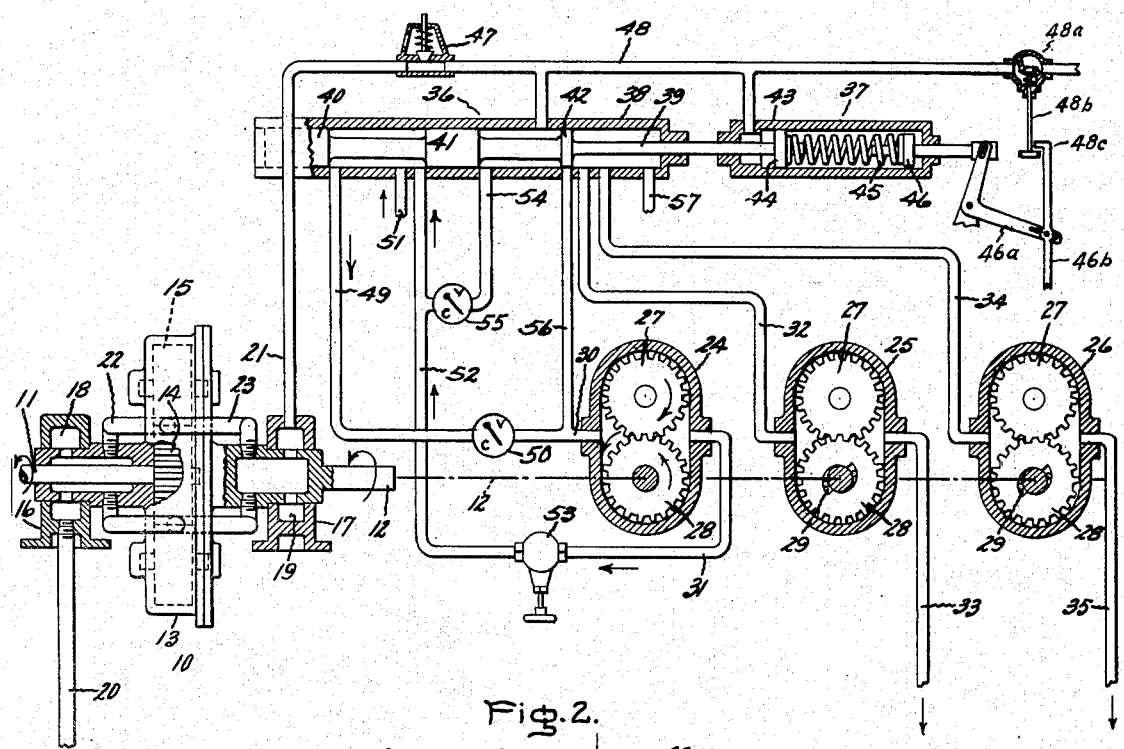
Figure 2:
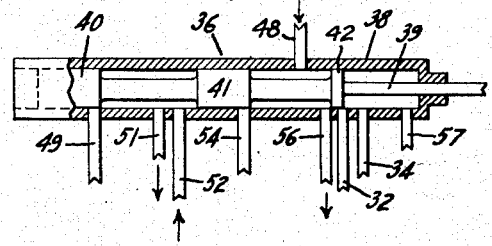
Figure 3:
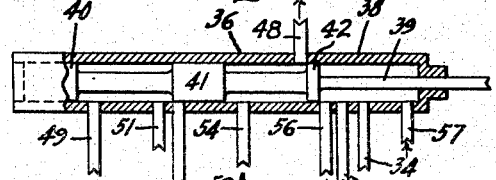

In the drawing, Fig. 1 illustrates a diagrammatic view of an arrangement embodying my invention; and Figs. 2 and 3 show parts of the arrangement in different operating positions.

The arrangement shown comprises a hydraulic gear or primary element 10 of the positive displacement type having a primary or drive shaft 11 and a secondary or driven shaft 12. The gearing 10 also includes a casing 13 enclosing pumping or fluid means of the positive displacement type, in the present example a planetary gear means comprising a sun gear 14 secured to the drive shaft 11 and a plurality of planetary gears 15 meshing with the sun gear 14 and rotatably supported in the casing 13. The casing 13 is rotatably supported on pedestals 16 and 17 and the driven shaft 12 is rigidly secured to the casing 13. The pedestals 16, 17 form chambers 18 and 19 connected to conduits 20 and 21 respectively and communicating through channel means 22 and 23 respectively with inlet and outlet spaces formed by the fluid displacement means in the present example adjacent the intermeshing portions of the sun gear, the planetary gears and the casing.

The output or driven shaft 12 of the primary hydraulic gear 10 in accordance with my invention is connected to the shafts of one or a plurality of hydraulic units or motors. In the present instance I have shown three gear units of the positive displacement type 24, 25 and 26, each having a casing enclosing two gears 27 and 28. One of these gears, in the present example the gear 28 of each pump, is connected to the shaft 12. The gear 28 of the pump 24 is directly fastened to the shaft 12 while the gears 28 of the units 25 and 26 are connected to the shaft 12 through an overdrive clutch or free wheel mechanism 29.

The unit 24 has inlet and outlet conduits 30 and 31, either of which may act as inlet or outlet, depending upon the operating condition of the arrangement. The unit 25 has an inlet conduit 32 and an outlet conduit 33, and the unit 26 has an inlet conduit 34 and an outlet conduit 35.

In case the primary hydraulic gear 10 cannot overcome the torque or load on the shaft 12, the latter with the casing 13 remains stationary and the primary unit 10 acts only as a pump, liquid being forced from the inlet conduit 20 through the outlet conduit 21. This liquid under pressure is utilized to operate one or several of the units 24, 25, 26 as motors, thus to aid the primary unit 10 to carry the load when the torque is too great for the primary unit alone. To this end means are provided for connecting the inlet conduits of the units 24, 25 and 26 to the outlet conduit 21 of the primary unit 10. This means includes a valve mechanism 36 actuated by a control mechanism 37. The mechanism 36 comprises a casing 38 and a stem 39 projecting through the cylindrical casing 38 and carrying three spaced valve heads 40, 41 and 42. The control mechanism 37 includes a cylinder 43, a piston 44 slidably projecting into the cylinder and secured to an extension of the valve stem 39. The piston is biased towards the left by a compression spring 45 having one end bearing against the piston and another end bearing against a stop 46. The latter may be adjusted by means including a bell crank lever 46a connecting the stop 46 to a control rod 46b. The cylinder 38 of the valve mechanism has a plurality of ports connected to the units 10, 24, 25, 26 and to a sump or reservoir for operating liquid such as oil, not shown.

In the position of the valve heads shown in Fig. 1 of the drawing the conduit 21 of the unit 10 is connected to a port between the heads 41, 42. The conduit 21 includes a safety relief valve 47 arranged to open if the pressure exceeds a certain value. An extension 48 of the conduit 21 is connected to the lefthand end of the control cylinder 43. The extension 48 includes a normally closed valve 48a having a stem 48b connected to a lost motion connecting means 48c to the control rod 46b. The control rod 46b may be interconnected with the control mechanism of a combustion engine or like prime mover (not shown) for driving the primary hydraulic unit 10. Upon downward movement of the control rod 46b the compression of the biasing spring 45 is reduced and as the rod 46b is moved down the valve 48a in a certain position of the rod 46b is opened to effect draining of operating fluid from the conduit 21, 48.

A conduit 49 including a check valve 50 connects the conduit 30 of the unit 24 to a port adjacent the righthand side of the valve head 40. A port intermediate the valve heads 40, 41 is connected by a conduit 51 to a reservoir or sump, not shown. A port adjacent the lefthand face of the valve head 41 is connected by a conduit 52 including a valve 53 to the conduit 31 of the unit 24. A port adjacent the righthand face of the valve head 41 is connected by a conduit 54 including a check valve 55 to a point of the conduit 52 between the valve 53 and the valve cylinder 38. Another port of the cylinder 38 covered by the valve head 42 is connected by a conduit 56 to the conduit 30 of the unit 24. A further port spaced from the righthand face of the valve head 42 is connected to the inlet conduit 32 of the unit 25. Still another port spaced from the last mentioned port is connected to the inlet conduit 34 of the unit 26. A conduit 57 connects a port near the righthand end of the cylinder 38 to a sump, not shown.

The operation of the torque transmission mechanism is as follows: Let us assume that the input shaft 11 is driven by a power agency such as a prime mover and that upon starting the units 10 and 24 with the valve 36 positioned as shown in Fig. 3 cannot carry the load. The shaft 12 therefore remains stationary. During such condition the unit 10 acts as a pump forcing liquid from the inlet conduit 20 through the pump 10 into the outlet conduit 21. The liquid pressure thus developed is transmitted through the conduit 21 and the conduit 48 to the lefthand face of the pressure piston 44 which thereupon is moved towards the right against the compression of the spring 45. This causes movement of the valve stem 39 with its heads towards the right, that is, from the position in Fig. 3 to that in Fig. 1. If the load is too great at this time to permit shaft 12 to rotate, piston 44 will be moved until the valve is in its Fig. 2 position in which the heads 42 and 41 uncover the port connections to the conduits 56 and 52 respectively. This permits liquid under pressure to be forced from the conduit 21 through the cylinder 38, the conduit 56 and the inlet conduit 30 to the unit 24, causing the latter to operate as a motor with the gears rotating in the direction indicated by arrows on gears 27, 28. The liquid or operating medium is discharged through the conduits 31, 52 to the space between the valve heads 40, 41 and drained therefrom through the conduit 51. Free flow of operating liquid through the unit 24, however, will take place only if the gears 27, 28 of the unit 24 rotate, that is, if the unit 24 together with the first unit 10 are able to carry the load. If this is not the case and the load is still too great the gear 28 with the shaft 12 remain stationary, the outlet pressure of the first unit 10 will rise further, thereby causing the piston 44 of the control mechanism to be forced further to the right until connection is established between the conduit 21 and the inlet conduit 32 of the unit 25 and liquid under pressure is supplied from the first unit 10 to both units 24 and 25.

If this is still not enough to carry the load, the discharge pressure of the unit 10 will rise further, causing further movement towards the right of the piston 44 of the control mechanism until the valve head 42 of the valve mechanism is moved towards the right beyond the port connection with the inlet conduit 34 of the last unit 26. Let us assume that under this condition the three secondary units 24, 25, and 26 together with the primary unit 10 can carry the load and cause rotation of the shaft 12. The three secondary units 24, 25, and 26 operate as motors with their inlets connected in parallel to receive fluid under pressure discharged from the primary unit 10. During such operation the units 24, 25 and 26 and the shaft 12 are rotated in the direction of the arrows indicated on the gears of the unit 24. If now the load on the output shaft 12 decreases, the torque drops and the discharge pressure in the conduit 21 decreases accordingly. This reduced pressure being transmitted to the control mechanism 37 permits movement of the piston 44 towards the left by action of the biasing spring 45. During such movement the valve head 42 covers the port connection to the conduit 34 and thus disconnects the unit 26 from its source of supply, that is, from the first unit 10. The gear 28 of the unit 26 then is disengaged from the shaft 12 by action of the overdrive clutch or free wheeling mechanism 29. The gears 27, 28 of the unit 26 accordingly may remain stationary or idle slowly at a speed independent from the speed of the shaft 12.

Upon further decrease in load on the shaft 12 the torque decreases further and the discharge pressure in the conduit 21 drops further, causing additional movement of the piston 44 towards the left whereupon the valve head 42 covers the port connection to the unit 25, thus putting the latter out of operation. As the gear 28 of the unit 25 is also connected by a free wheeling or overdrive clutch mechanism 29 to the shaft 12, it is automatically disengaged and together with the gear 27 of this unit may remain stationary or idle slowly.

Now let us assume that the primary unit 10 with the secondary unit 24 carries the load. If during such operation a further decrease in load on the shaft 12 takes place the torque decreases further and the discharge pressure in the conduit 21 drops further, causing the piston 44 of the control mechanism to move further to the left to a position, as shown in Fig. 1, in which the primary element 10 carries the whole torque and load and the motors 24, 25 and 26 idle. As will be noted in Fig. 1, in this position there is no outlet for fluid from the primary unit 10. Under this condition the input shaft 11 and the casing 13 with the output shaft 12 revolve at the same speed. The unit 24 is short-circuited, the supply conduit 49 and the discharge conduit 52 are connected through the space between the heads 40 and 41. If the torque on output shaft 12 is further reduced, the valve 38 moves further to the left to a position (Fig. 3) in which the head 41 covers the connection to the conduit 52. The liquid is discharged under a pressure which varies with torque and speed of output shaft 12, through the conduits 31 and 54 into the conduit 21 of the primary unit 10. The liquid is forced through the unit 10 and discharged therefrom through the conduit 20 to the sump, the casing 13 with the shaft 12 then being rotated at a speed greater than the speed of the driven shaft 11.

The speed of the units 24, 25 and 26 depends upon the capacity of the pumping means 14, 15 relative to the capacity of the units 24, 25, 26. If we assume, for example, that for each revolution of the shaft 11 relative to shaft 12 a volume of fluid is displaced by the unit 10 equal to the volume that each unit 24, 25, 26 will displace in one revolution of shaft 12, then when all three units receive fluid from the pump 10 the shaft 11 must make four revolutions for each revolution of the shaft 12 because the shaft 11 will have rotated three more revolutions than shaft 12 to displace three times the volume of a single unit 24. When delivery is only to the units 24 and 25, shaft 11 will make three revolutions for each revolution of shaft 12, and when delivery is to unit 24 alone then shaft 11 will make two revolutions for each revolution of the shaft 12. When all units 24, 25, 26 are cut off, flow from the unit 10 will be blocked and the shaft 12 must make one revolution for each revolution of the shaft 11, that is, the pump 10 must operate at a speed ratio of 1:1. When the valve is placed as in Fig. 3, shaft 12 will rotate faster than shaft 11.

The entire hydraulic transmission may be unloaded by opening of the valve 48a, thus preventing the building up of pressure in the outlet chamber 19 of the primary unit. Under such condition no torque can be transmitted from the input shaft 11 to the output shaft 12.

If a brake is wanted, power on the drive shaft 11 is cut off and the valve 53 is closed. This will cause an absorption of power from the shaft 12. If the valve 53 is completely closed, the shaft 12 cannot turn. The shaft 11 would slow up or stop after power was cut off from it. Then the continued rotation of the shaft 12 would cause the oil from the unit 24 to be pumped by the primary element 10 out of the conduits 21 and 54. Oil to the motor 24 is supplied through the conduit 49 and cylinder 38 from the sump. The pressure in conduit 21 will fall due to the pumping action of the primary element 10.

Thus, with my invention I have designed an improved arrangement of hydraulic torque transmission. Broadly, an embodiment according to my invention includes a first and a second hydraulic unit of the positive displacement type each having a first and a second chamber together with means including a valve mechanism for connecting in one position the second chamber of the first or primary unit to the first chamber of the second or secondary unit and for connecting in another position the second chamber of the primary unit to the second chamber of the secondary unit whereby in one position of the valve mechanism the secondary unit is operated as a hydraulic motor to aid the primary unit to furnish a certain torque while in the other position of the valve mechanism the secondary unit is operated as a pump for supplying operating medium under pressure to the primary unit.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

1. Hydraulic torque transmission arrangement comprising a plurality of hydraulic units of the positive displacement type, one of the units comprising a casing having an inlet and an outlet, means rotatably supporting the casing, fluid displacement means disposed within the casing, conduit means for conducting operating liquid to and from the casing and separate shafts secured to the fluid displacement means and to the casing respectively, the other units each including a casing having inlet and outlet openings, fluid displacement means disposed within the casing including a rotor with shaft mechanically connected to one of said separate shafts, said mechanical connection including free wheeling means with regard to at least one of the other units, and means including a valve mechanism for hydraulically connecting the other units in parallel to the outlet of the first unit and for controlling the number of said other units thus connected in parallel in response to changes in torque on the last mentioned separate shaft.

2. Hydraulic torque transmission arrangement comprising a primary and secondary hydraulic units, each having a casing forming inlet and outlet chambers and fluid displacement means disposed in the casing including an element with a shaft projecting through the casing, means rotatably supporting the casing of the primary unit, the primary unit having a second shaft secured to the casing, means mechanically connecting the last mentioned shaft of the primary unit to the shafts of the secondary units, said mechanical connection including free wheeling means with regard to one secondary unit, conduit means and a valve mechanism for successively connecting the inlet chambers of the secondary units in parallel to the outlet chamber of the primary unit and for successively disconnecting the inlet chambers of the secondary units from the outlet chamber of the primary unit, and a control mechanism connected to position the valve mechanism in response to changes of the torque on the second shaft.

3. Hydraulic torque transmission arrangement comprising primary and secondary hydraulic units of the positive displacement gear type, each having a casing forming inlet and outlet chambers and gear means disposed in the casing including a gear with a shaft projecting through the casing, the primary unit including means rotatably supporting its casing, and a second shaft secured to the casing, means mechanically connecting the second shaft to the gears of the secondary units, said mechanical connection including free wheeling devices between the second shaft and the gears of at least one secondary unit, conduit means and a valve mechanism for connecting the inlet chambers of the secondary units in parallel to the outlet chamber of the primary unit and for successively disconnecting the inlet chambers of the secondary units from the outlet chamber of the primary unit, and a control mechanism responsive to pressure changes in the outlet chamber of the primary unit for positioning the valve mechanism.

4. Hydraulic torque transmission arrangement comprising a plurality of hydraulic units of the positive displacement gear type, each having a casing forming an inlet and an outlet chamber, gear means disposed within the casing including a gear having a shaft projecting through the casing, one of the units constituting a primary unit and including a second shaft secured to the casing and means rotatably supporting the casing, means mechanically connecting a shaft of the primary unit to the shafts of the secondary units, conduit means and a valve mechanism for successively connecting and disconnecting the inlet chambers of the secondary units to the outlet chamber of the primary unit, means controlling the valve mechanism in response to changes of torque on the last mentioned shaft of the primary unit, and a free wheeling means between the gear and shaft of at least one of the secondary units.

5. Hydraulic torque transmission arrangement comprising a plurality of hydraulic units of the positive displacement gear type, each having a casing forming an inlet and an outlet chamber, gear means disposed within the casing including a gear having a shaft projecting through the casing, one of the units constituting a primary unit and having a second shaft secured to the casing and means rotatably supporting the casing, means mechanically connecting one of the shafts of the primary unit to the shafts of the secondary units, means including a valve mechanism for successively connecting and disconnecting the inlet chambers of the secondary units to and from the outlet chamber of the primary unit, means controlling the valve mechanism in response to changes of fluid pressure in the primary unit, and means including said valve mechanism and at least one of the secondary units for forcing operating liquid from a source into the primary unit during certain operating conditions.

6. Hydraulic torque transmission arrangement comprising a plurality of hydraulic units of the positive displacement gear type, each having a casing forming an inlet and an outlet chamber, gear means disposed within the casing including a gear having a shaft, one of the units constituting a primary unit and having a second shaft secured to the casing and means rotatably supporting the casing, means for mechanically connecting one of the shafts of the primary unit to the shafts of the secondary units, means including a valve mechanism for successively connecting and disconnecting a chamber of each secondary unit to and from a chamber of the primary unit, means controlling the valve mechanism in response to changes of fluid pressure in one of the units, and means including one of the secondary units, a conduit connecting the discharge chamber to the valve mechanism and a conduit for connecting the valve mechanism to a reservoir for forcing operating liquid through the valve mechanism into the primary unit during overdrive conditions.

7. Hydraulic torque transmission arrangement comprising a primary hydraulic unit of the positive displacement gear type having a casing with an inlet chamber for connection to a reservoir of operating liquid and an outlet chamber, means rotatably supporting the casing, planetary gear means including a sun gear with a drive shaft and a driven shaft secured to the casing, a plurality of secondary hydraulic units of the positive displacement gear type, each having a casing with an inlet and an outlet chamber, gear means disposed in the casing including a gear with a shaft mechanically connected to said driven shaft, means including a valve mechanism for successively connecting the inlet chambers of the secondary units to the outlet chamber of the primary unit, a control mechanism responsive to pressure changes in the outlet chamber of the primary unit for actuating the valve mechanism, and means including one of the secondary units and a connection for connecting the valve mechanism to a reservoir of operating liquid to force operating liquid during overspeed condition by the pumping action of such secondary unit through the valve mechanism into the primary unit, and a brake valve in the discharge conduit of the last mentioned secondary unit for effecting braking action and for reducing the speed during operation.

8. Hydraulic torque transmission arrangement comprising a primary hydraulic unit of the positive displacement gear type having a casing having a shaft and forming an inlet chamber for connection to a reservoir of operating liquid and an outlet chamber, means rotatably supporting the casing and gear means including a gear with a drive shaft, a plurality of secondary hydraulic units of the positive displacement gear type, each having a casing with an inlet and an outlet chamber, gear means disposed in the casing including a gear with a shaft mechanically connected to said casing shaft, means including a valve mechanism for connecting the inlet chambers of each secondary unit to the outlet chamber of the primary unit, a control mechanism responsive to pressure changes in the outlet chamber of the primary unit for actuating the valve mechanism, and means including one of the secondary units and a connection for connecting the valve mechanism to a reservoir of operating liquid to force operating liquid during overspeed condition by the pumping action of such secondary unit through the valve mechanism into the primary unit, a brake valve associated with one of the secondary units, and free wheeling means between the gear and shaft of at least one of the secondary units except that of the last mentioned unit.

9. Hydraulic torque tranmission arrangement comprising a primary and a secondary hydraulic unit, the primary unit having a driving and a driven shaft, the secondary unit having an output shaft secured to the driven shaft of the primary unit, each unit having a first chamber and a second chamber, a valve mechanism for connecting in one position the second chamber of the primary unit to the first chamber of the secondary unit and for connecting in another position the second chamber of the secondary unit to the second chamber of the primary unit, and means for actuating the valve mechanism in response to pressure changes in the second chamber of the primary unit.

10. Hydraulic torque transmission arrangement comprising a primary and a secondary hydraulic unit of the positive displacement type, the primary unit having a drive shaft for connection to a power agency and a driven shaft mechanically connected to the second unit, each unit having a first and a second chamber, means including a valve mechanism for alternately connecting the second chamber of the primary unit to either of the first or second chamber of the secondary unit whereby the secondary unit is operated as motor and as pump respectively, and means for positioning the valve mechanism in response to changes of torque demand from the driven shaft of the primary unit.

11. Hydraulic torque transmission arrangement comprising a primary and a secondary hydraulic unit of the positive displacement type, the primary unit having a drive shaft for connection to a power agency and a driven shaft mechanically connected to the second unit, each unit having a first and a second chamber, means including a valve mechanism for alternately connecting the second chamber of the primary unit to either of the first or second chamber of the secondary unit, and means for positioning the valve mechanism including a pressure responsive device having a cylinder forming a pressure chamber and a piston movably disposed therein and connected to the valve mechanism, a conduit including a normally closed drain valve connecting the pressure chamber to the outlet of the primary unit, means including a compression spring and an adjustable stop for biasing the piston against the pressure in the pressure chamber, and means including a lost motion connection for connecting the adjustable stop to said last named valve to open said valve in a predetermined position of said stop.

JOHN H. DORAN